United States Patent
Satoh et al.

(10) Patent No.: US 7,253,588 B2
(45) Date of Patent: Aug. 7, 2007

(54) OVERDISCHARGE PREVENTING CIRCUIT APPARATUS FOR A NONAWUEOUS ELECTROLYTE SECONDARY BATTERY, OVERDISCHARGE PREVENTING CIRCUIT APPARATUS FOR A BATTERY PACK, SECONDARY BATTERY OVERDISCHARGE PREVENTING METHOD AND OVERDISCHARGE PREVENTING METHOD FOR A BATTERY PACK

(75) Inventors: Yuji Satoh, Sagamihara (JP); Motoya Kanda, Yokohama (JP); Takashi Kishi, Yokosuka (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 217 days.

(21) Appl. No.: 10/650,769

(22) Filed: Aug. 29, 2003

(65) Prior Publication Data
US 2005/0237686 A1 Oct. 27, 2005

(30) Foreign Application Priority Data
Aug. 30, 2002 (JP) ............................. 2002-252502

(51) Int. Cl.
*H01M 10/44* (2006.01)
*H01M 10/46* (2006.01)

(52) U.S. Cl. ..................................... 320/136
(58) Field of Classification Search ................ 320/134, 320/136, 150, 153
See application file for complete search history.

(56) References Cited

U.S. PATENT DOCUMENTS

| 5,278,000 A | * | 1/1994 | Huang et al. ................. 429/91 |
| 6,016,047 A | * | 1/2000 | Notten et al. ............... 320/137 |
| 6,210,824 B1 | * | 4/2001 | Sullivan et al. ............... 429/61 |

FOREIGN PATENT DOCUMENTS

| JP | 60-77374 | * | 5/1985 |
| JP | 04-033271 | | 2/1992 |
| JP | 08-098422 | | 4/1996 |

* cited by examiner

*Primary Examiner*—Edward H. Tso
(74) *Attorney, Agent, or Firm*—Oblon, Spivak, McClelland, Maier & Neustadt, P.C.

(57) ABSTRACT

An overdischarge preventing circuit apparatus according to this invention is an overdischarge preventing circuit apparatus for a nonaqueous electrolyte secondary battery, including a discharge control mechanism which controls discharge of the nonaqueous electrolyte secondary battery when a surface temperature of the nonaqueous electrolyte secondary battery exceeds a discharge control temperature $T_1$ (° C.) represented by $$T_1 = T_0 + QA \qquad (1)$$

where $T_0$ is an ambient temperature (° C.), Q is 8 (° C./C), and A is a discharge rate (C).

19 Claims, 4 Drawing Sheets

OVERDISCHARGE PREVENTING CIRCUIT APPARATUS FOR A NONAWUEOUS ELECTROLYTE SECONDARY BATTERY, OVERDISCHARGE PREVENTING CIRCUIT APPARATUS FOR A BATTERY PACK, SECONDARY BATTERY OVERDISCHARGE PREVENTING METHOD AND OVERDISCHARGE PREVENTING METHOD FOR A BATTERY PACK

CROSS-REFERENCE TO RELATED APPLICATION

This application is based upon and claims the benefit of priority from the prior Japanese Patent Application No. 2002-252502, filed Aug. 30, 2002, the entire contents of which are incorporated herein by reference.

BACKGROUND OF THE INVENTION

1. Field of the Invention

The present invention relates to an overdischarge preventing circuit apparatus for a secondary battery detachably attached to an electric apparatus or incorporated in an electric apparatus, and an overdischarge preventing method for a secondary battery.

2. Description of the Related Art

When a secondary battery which can be repeatedly used by charging is discharged below a predetermined battery voltage, the battery performance deteriorates, so the cycle life significantly shortens. Therefore, overdischarge of a secondary battery is prevented by using a method which detects the battery voltage of a secondary battery and, if this battery voltage falls below a predetermined voltage, shuts down discharge of the secondary battery. For example, in Jpn. Pat. Appln. KOKAI Publication No. 4-33271, a switching element is connected in series with a secondary battery and turned off if the battery voltage of the secondary batter falls below a predetermined voltage, thereby shutting down discharge. In this reference, the switching element is kept off until the battery voltage of the secondary battery becomes slightly higher than the predetermined voltage. When the battery voltage becomes slightly higher than the predetermined voltage, the switching element is turned on to resume discharge. That is, a hysteresis characteristic is given between the shutdown voltage and resumption voltage of discharge. For example, this circuit is implemented by using a Schmitt trigger circuit.

Nonaqueous electrolyte secondary batteries such as lithium ion secondary batteries have been mainly used in portable electronic apparatuses such as personal computers, cell phones, and PDAs. In these applications, a discharge current is the largest in a personal computer, a maximum of about 4 A, and causes intermittent discharge. Hence, overdischarge can be prevented by detecting the battery voltage.

Recently, it is being attempted to use this nonaqueous electrolyte secondary battery in an electric apparatus which requires discharge with a large electric current. Examples are an uninterrupted power supply (UPS) for a personal computer (PC) or server, a cordless cleaner, an electric tool, and an automotive electronic apparatus. To use a nonaqueous electrolyte secondary battery in such an electric apparatus, discharge must be performed continuously with a large electric current of, e.g., 10 A or 20 A. This increases the heat generation amount by Joule heat when the secondary battery supplies power (discharges). Accordingly, the method which stops discharge when a predetermined battery voltage is reached cannot prevent overdischarge and, in addition to that, may cause a secondary disaster, e.g., an electrolyte leakage or a heat deterioration of a battery pack, by heat generation.

The scope of claims of Jpn. Pat. Appln. KOKAI Publication No. 8-98422 describes that when the battery temperature rises to a predetermined value or higher, charge or discharge of a battery is stopped by a switching circuit. Also, paragraph [0006] of this publication discloses a structure, as a protecting mechanism against a battery temperature rise, which opens the circuit at 70° C. or more by inserting a thermal protector in a pack battery.

If, however, a nonaqueous electrolyte secondary battery is discharged at a high rate, the battery temperature rises abruptly. Therefore, in the method in which discharge is stopped whenever the same battery temperature, e.g., 70° C., is reached, discharge must be stopped while a large dischargeable battery capacity remains. This makes it impossible to satisfactory achieve the performance of the battery.

BRIEF SUMMARY OF THE INVENTION

It is an object of the present invention to provide an overdischarge preventing circuit apparatus and overdischarge preventing method capable of preventing explosion and ignition when a nonaqueous electrolyte secondary battery is discharged at a high rate.

According to a first aspect of the present invention, there is provided an overdischarge preventing circuit apparatus for a nonaqueous electrolyte secondary battery, comprising a discharge control mechanism which controls discharge of the nonaqueous electrolyte secondary battery when a surface temperature of the nonaqueous electrolyte secondary battery exceeds a discharge control temperature $T_1$ (° C.) represented by $$T_1 = T_0 + QA \tag{1}$$

where $T_0$ is an ambient temperature (° C.), Q is 8 (° C./C), and A is a discharge rate (C).

According to a second aspect of the present invention, there is provided an overdischarge preventing circuit apparatus for a battery pack including a battery in which units each obtained by connecting nonaqueous electrolyte single cells in parallel are connected in series, comprising:

a discharge control mechanism which, when a surface temperature of the battery exceeds a discharge control temperature $T_1$ (C) represented by equation (1) below, stops discharge of the battery pack if a voltage of the battery is not more than a discharge stop voltage $V_a$ (V) represented by equation (2) below or a voltage of the single cell is less than 3 V, and lowers a discharge rate of the battery pack if the voltage of the battery is higher than the discharge stop voltage $V_a$ (V) and the voltage of the single cell is not less than 3 V:

$$T_1 = T_0 + QA \tag{1}$$

where $T_0$ is an ambient temperature (° C.), Q is 8 (° C./C), and A is a discharge rate (C); and $$V_a = n \times 3 \text{ (V)} \tag{2}$$

where n is the number of series-connected units in the battery.

According to a third aspect of the present invention, there is provided a secondary battery overdischarge preventing method comprising controlling discharge of a nonaqueous electrolyte secondary battery when a surface temperature of the nonaqueous electrolyte secondary battery exceeds a discharge control temperature $T_1$ (° C.) represented by $$T_1 = T_0 + QA \quad (1)$$

where $T_0$ is an ambient temperature (° C.), Q is 8 (° C./C), and A is a discharge rate (C).

According to a fourth aspect of the present invention, there is provided an overdischarge preventing method for a battery pack including a battery in which units each obtained by connecting nonaqueous electrolyte single cells in parallel are connected in series, comprising:

when a surface temperature of the battery exceeds a discharge control temperature $T_1$ (° C.) represented by equation (1) below, stopping discharge of the battery pack if a voltage of the battery is not more than a discharge stop voltage $V_a$ (V) represented by equation (2) below or a voltage of the single cell is less than 3 V, and lowering a discharge rate of the battery pack if the voltage of the battery is higher than the discharge stop voltage $V_a$ (V) and the voltage of the single cell is not less than 3 V:

$$T_1 = T_0 + QA \quad (1)$$

where $T_0$ is an ambient temperature (° C.), Q is 8 (° C./C), and A is a discharge rate (C); and $$V_a = n \times 3 \text{ (V)} \quad (2)$$

where n is the number of series-connected units in the battery.

DETAILED DESCRIPTION OF THE INVENTION

Figure 1:
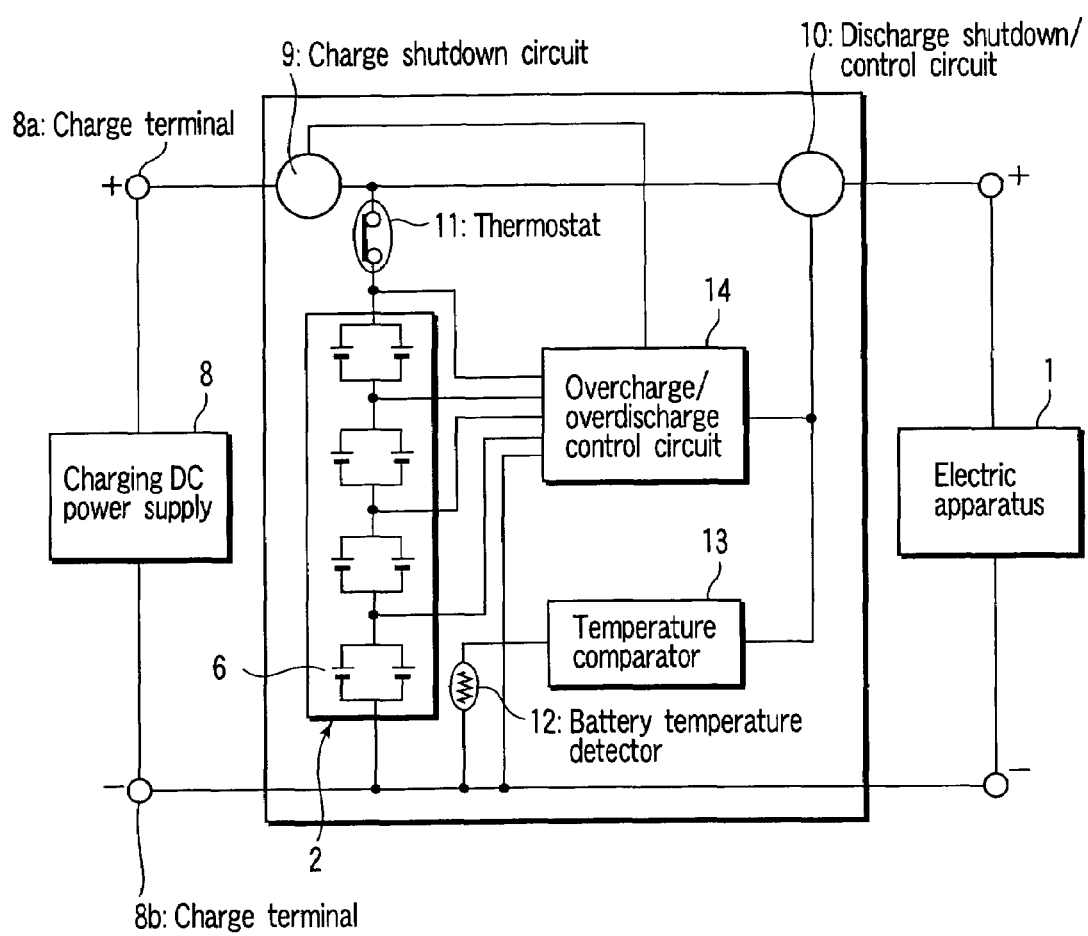
FIG. 1 is a block diagram showing an embodiment of an overdischarge preventing circuit apparatus according to the present invention.

In the present invention, when the surface temperature of a nonaqueous electrolyte secondary battery exceeds a discharge control temperature represented by equation (1) below, discharge control of the secondary battery is performed. Therefore, discharge can be controlled by taking account of the heat generation amount by Joule heat when the nonaqueous electrolyte secondary battery is discharged. As a consequence, it is possible to prevent overdischarge and avoid explosion and ignition by heat generation. If the voltage of the nonaqueous electrolyte secondary battery is equal to or less than a discharge stop voltage, it is desirable to stop discharge of the secondary battery. In this manner, overdischarge of the secondary battery can be reliably prevented.

For example, for a battery pack in which four batteries are connected in series, the nonaqueous electrolyte secondary battery discharge stop voltage is 4×3 V=12 V. Even when the surface temperature of the second battery exceeds the discharge control temperature, discharge can be performed if the voltage of the battery is 12 V or more. When discharge is continued to the discharge stop voltage by lowering the discharge rate, overdischarge, explosion and ignition can be avoided without interrupting discharge.

$$\text{discharge control temperature } T_1 = T_0 + QA \quad (1)$$

where $T_0$ is the ambient temperature (° C.), Q (a temperature difference per 1C) is 8 (° C./C), and A is the discharge rate (C).

The ambient temperature (° C.) is desirably the internal temperature of an electronic apparatus in which the secondary battery is incorporated. It is particularly desirable to use the surface temperature of an outer case of the battery pack as the ambient temperature. The ambient temperature is preferably 0 to 60° C. for the reasons explained below. If the ambient temperature is lower than 0° C., it may be impossible to obtain the excellent charge/discharge characteristics of the battery pack. If the ambient temperature exceeds 60° C., a nonaqueous electrolyte in a single cell decomposes to produce a gas, and this may expand the battery pack. Also, an ambient temperature exceeding 60° C. accelerates the battery temperature rise during discharge, so the battery temperature rapidly reaches the discharge control temperature $T_1$. This may increase the dischargeable battery capacity remaining in the battery pack. The ambient temperature is more preferably 10 to 45° C.

Although the discharge control temperature $T_1$ (° C.) is represented by equation (1) described above, this temperature is preferably not exceed the melting point of a separator. This is so because if the discharge control temperature $T_1$ (° C.) is set to be higher than the separator's melting point, the separator melts and causes electric current shutdown, so the battery function itself may be lost. More preferably, the discharge control temperature $T_1$ (° C.) is represented by equation (1) and is 120° C. or less. The discharge control temperature $T_1$ (° C.) is most preferably lower than 100° C.

An example of a secondary battery overdischarge preventing circuit apparatus according to the present invention will be described below with reference to the accompanying drawings.

Figure 2:
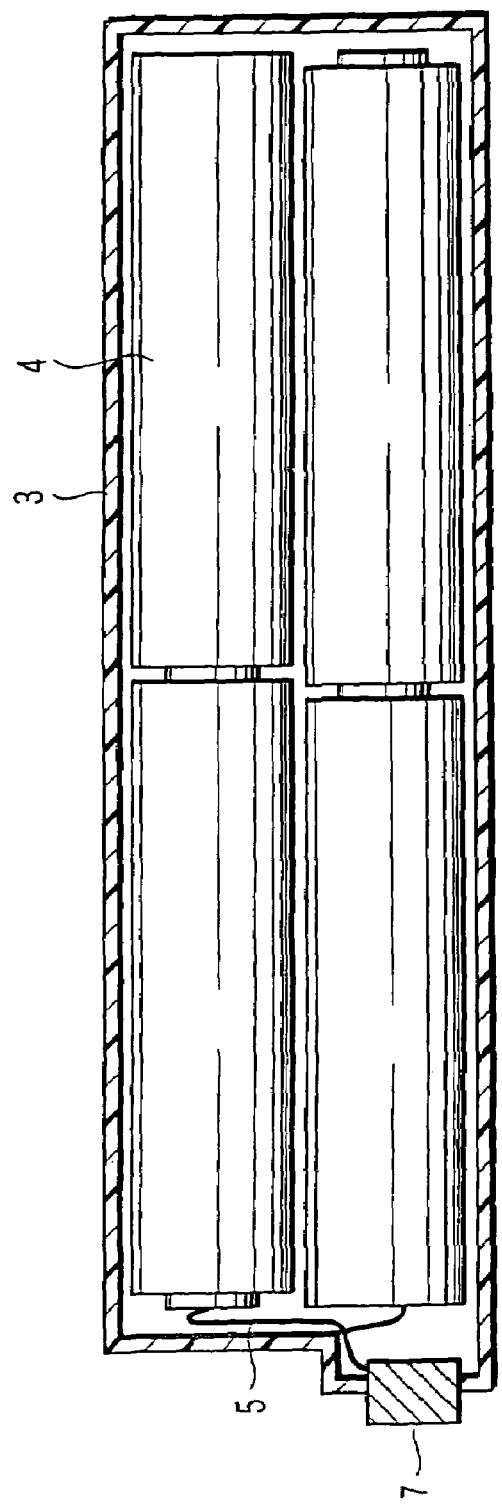
FIG. 2 is a sectional view in which an example of a battery pack used in the overdischarge preventing circuit apparatus shown in FIG. 1 is cut in the longitudinal direction.
Figure 3:
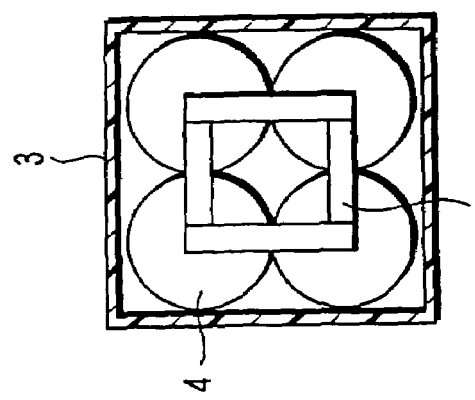
FIG. 3 is a sectional view in which the battery pack shown in FIG. 2 is cut in the lateral direction.
Figure 4:
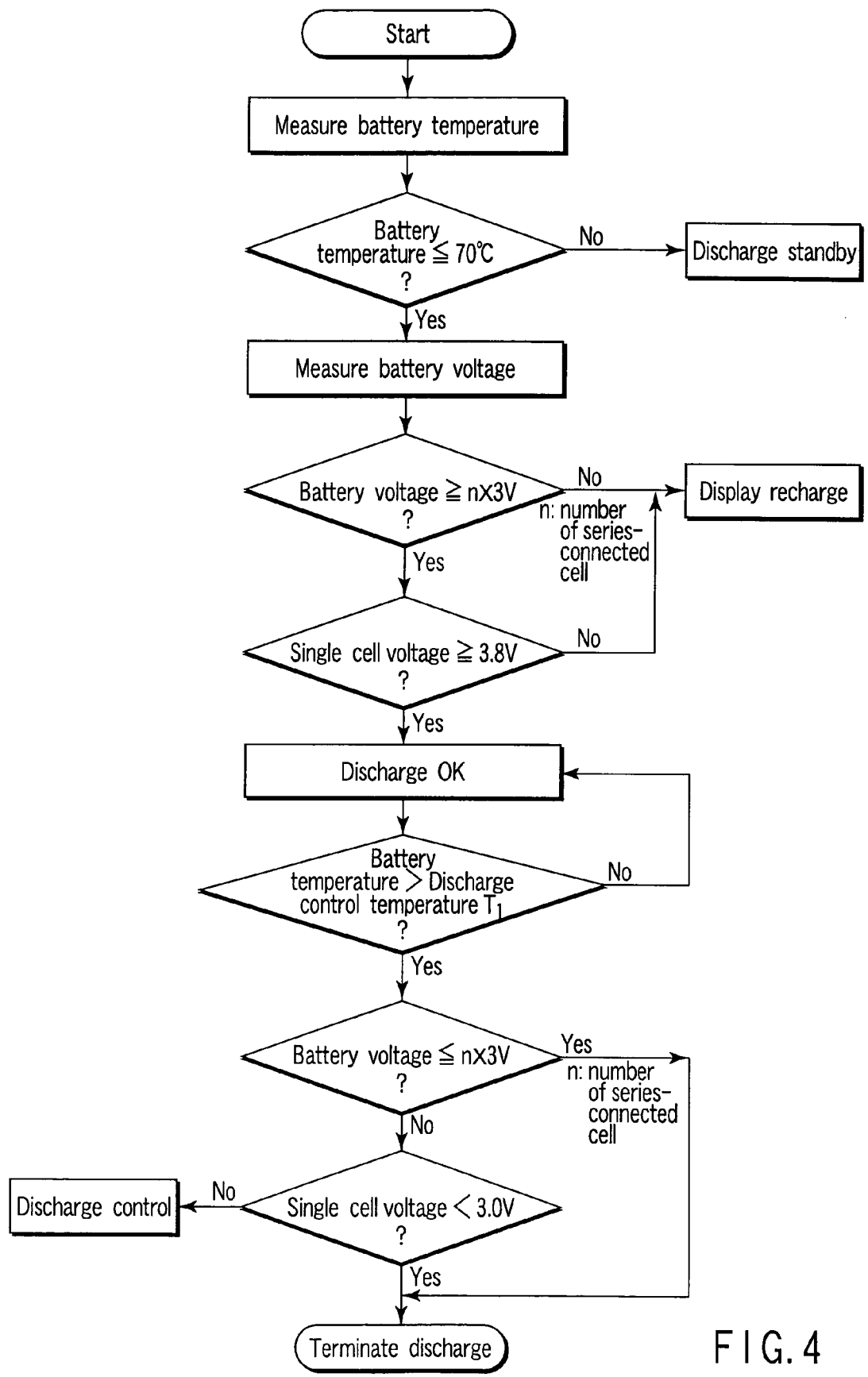
FIG. 4 is a flowchart showing a secondary battery discharge control method using the overdischarge preventing circuit apparatus shown in FIG. 1.

FIG. 1 is a block diagram showing an embodiment of the secondary battery overdischarge preventing circuit apparatus according to the present invention. FIG. 2 is a sectional view in which an example of a battery pack used in this overdischarge preventing circuit apparatus shown in FIG. 1 is cut in the longitudinal direction. FIG. 3 is a sectional view in which the battery pack shown in FIG. 2 is cut in the lateral direction. FIG. 4 is a flowchart showing a secondary battery discharge control method using the overdischarge preventing circuit apparatus shown in FIG. 1.

An electric apparatus 1 such as an uninterrupted power supply (USP) for a personal computer (PC) or server, a cordless cleaner, an electric tool, or an automotive electronic apparatus incorporates a detachable battery pack 2 capable of discharge with a large electric current of 4C to 7C. As shown in FIGS. 2 and 3, the battery pack 2 includes an outer case 3 and a battery made up of eight cylindrical lithium ion single cells 4 laid on their sides in the outer case 3. In this battery, four cell units 6 each obtained by connecting two cylindrical lithium ion single cells 4 in parallel by a lead 5 are connected in series by leads 5. To ensure insulating properties, the outer case 3 is desirably made of a resin such as ABS resin or PC resin. An external connecting terminal 7 to be connected to the load of the electronic apparatus is formed on an outer surface of an outer case wall opposite to the positive and negative terminals of the lithium ion single cells 4.

The positive terminal of the battery pack 2 is electrically connected to the + (positive) side of the built-in load of the electric apparatus 1, and the negative terminal of the battery pack 2 is electrically connected to the − (negative) side of the load. These positive and negative terminals of the battery pack 2 are also electrically connected to a + charge terminal 8a and − charge terminal 8b of a charging DC power supply 8. A charge shutdown circuit 9 is electrically connected between the positive terminal of the battery pack 2 and the + charge terminal 8a. A discharge is shutdown/control circuit 10 is electrically connected between the positive terminal of the battery pack 2 and the + side of the load. The discharge shutdown/control circuit 10 has a stop function of stopping discharge of the battery pack 2 using control signals from an overcharge/overdischarge control circuit 14 and a temperature comparator 13, and an adjustment function of adjusting a discharge rate of the battery pack 2. A thermostat 11 is electrically connected between the positive terminal of the battery pack 2 and the discharge shutdown/control circuit 10.

A battery temperature detector 12 has a thermocouple (not shown) provided on the surface of each lithium ion single cell 4 of the battery pack 2, and is electrically connected to the negative terminal of the battery pack 2. As the temperature detection method, a thermistor or the like may also be used instead of the thermocouple. The temperature detector can be adhered to the battery surface by, e.g., (a) a adhesive tape containing glass fibers or (b) a silicone resin having high thermal conductivity. A temperature comparator 13 is electrically connected between the battery temperature detector 12 and the discharge shutdown/control circuit 10. The temperature comparator 13 compares a discharge control temperature $T_1$ calculated from the discharge rate of the battery pack 2 on the basis of equation (1) below with a battery surface temperature $T_2$ detected by the battery temperature detector 12. If the battery surface temperature $T_2$ is higher than the discharge control temperature $T_1$, the temperature comparator 13 outputs a detection signal to the discharge shutdown/control circuit 10. Consequently, the discharge shutdown/control circuit 10 stops driving of the load by the battery pack 2, i.e., stops discharge of the secondary battery.

$$\text{discharge control temperature } T_1 = T_0 + QA \quad (1)$$

where $T_0$ is the ambient temperature (° C.), Q is 8 (° C./C), and A is the discharge rate (C).

If the battery voltage and single cell voltage are equal to or larger than a predetermined value when the battery surface temperature $T_2$ is higher than the discharge control temperature $T_1$, it is desirable to smaller the discharge rate instead of stopping discharge. That is, an overcharge/overdischarge controller 14 such as an overcharge/overdischarge control circuit 14 includes a voltage comparator which detects a voltage (single cell voltage) $V_1$ of each cell unit 6 forming the battery pack 2 and a voltage $V_2$ as a battery, compares the single cell voltage $V_1$ with a defined value (3 V), and compares the battery voltage $V_2$ with a discharge stop voltage $V_a$. In addition, the overcharge/overdischarge controller 14 is electrically connected to the charge shutdown circuit 9 and discharge shutdown/control circuit 10. If the battery voltage $V_2$ is higher than the discharge stop voltage and the single cell voltage $V_1$ is 3 V or more, the overcharge/overdischarge controller 14 outputs this information as a detection signal to the discharge shutdown/control circuit 10. Consequently, the discharge shutdown/control circuit 10 lowers the discharge rate of the secondary battery, and discharge at this low rate is continuously performed until the battery voltage $V_2$ becomes equal to or lower than the discharge stop voltage. Note that the discharge stop voltage $V_a$ is a value calculated by multiplying 3 V by the number n of series-connected units, i.e., calculated by (n×3 V).

If the battery voltage $V_2$ is equal to or lower than the discharge stop voltage $V_a$ and the single cell voltage $V_1$ is less than 3 V, the overcharge/overdischarge controller 14 outputs a detection signal indicating this information to the discharge shutdown/control circuit 10. As a consequence, the discharge shutdown/control circuit 10 stops driving of the load by the battery pack 2, i.e., stops discharge of the secondary battery.

Discharge control by the secondary battery overdischarge preventing circuit as described above will be explained below with reference to FIG. 4.

(Battery Temperature Measurement)

The battery temperature detector 12 detects the surface temperature of a single cell of the battery pack 2. If this surface temperature is higher than 70° C., the battery pack 2 is cooled as it is left to stand, and it is determined until the single cell surface temperature of the battery pack 2 becomes 70° C. or less that the battery is in a discharge standby state.

(Battery Voltage Measurement)

If the surface temperature of the battery pack 2 is 70° C. or less, the overcharge/overdischarge controller 14 first measures the battery voltage. If this battery voltage is less than the discharge stop voltage, charge is performed by using the charging DC power supply 8. Since n is 4 in FIG. 1, the discharge stop voltage is 12 V. If the battery voltage is (n×3 V) or more, the overcharge/overdischarge controller 14 measures the single cell voltage. If this single cell voltage is less than 3.8 V, an additional charge is performed. If the single cell voltage is 3.8 V or more, it is determined without performing charge that the battery is in a dischargeable state.

(Discharge)

Discharge is continuously performed at a high rate. A discharge rate A is desirably 4C to 7C for the reasons explained below. If the discharge rate A is less than 4C, the rise rate of the battery temperature during discharge is low, so discharge is complete before the surface temperature of the battery reaches the discharge control temperature $T_1$. Therefore, safety can be assured without any discharge control by equation (1) described above. If the discharge rate A is higher than 7C, the rise rate of the battery temperature during discharge is high, so discharge is stopped by discharge control by equation (1) while discharge is still possible. This shortens the battery pack discharge duration. In addition, if the discharge rate A is more than 7C, the discharge control temperature $T_1$ sometimes exceeds 100° C. when the ambient temperature $T_0$ is set at a high temperature. This may lead to explosion of the battery or ignition even if discharge control by equation (1) is performed. The discharge rate is more preferably 4C to 6C.

1C is a current value required to completely discharge the battery in 1 hr. For convenience, the value of the nominal capacity of the battery can be used as a current value of 1C.

If the battery temperature rises by Joule heat caused by continuous discharge at a high rate and the surface temperature $T_2$ of the battery pack 2 detected by the battery temperature detector 12 exceeds the discharge control temperature $T_1$ (e.g., 68° C.) calculated on the basis of equation (1) {discharge control temperature $T_1=T_0+QA$}, power supply to the load of the electronic apparatus 1 by the battery pack 2 is stopped, i.e., discharge is terminated. Consequently, it is possible to prevent overdischarge of the nonaqueous electrolyte secondary battery, and avoid explosion and ignition of the secondary battery by heat generation.

Even when the surface temperature $T_2$ of the battery pack 2 is higher than the discharge control temperature $T_1$ calculated on the basis of equation (1) {discharge control temperature $T_1=T_0+QA$}, if the battery voltage measured by the overcharge/overdischarge controller 14 is higher than the discharge stop voltage $V_a$ (n×3 V) and the single cell voltage is 3 V or more, the rise of the battery temperature can be suppressed by continuing discharge at a low rate. Accordingly, explosion and ignition by heat generation can be avoided while a sufficient discharge time of the secondary battery is assured.

Note that even when the surface temperature $T_2$ of the battery pack 2 is higher than the discharge control temperature $T_1$ calculated on the basis of equation (1) {discharge control temperature $T_1=T_0+QA$}, if the battery voltage is equal to or less than the discharge stop voltage $V_a$(n×3 V) or if the single cell voltage is less than 3 V although the battery voltage is higher than the discharge stop voltage $V_a$ (n×3 V), it is desirable to stop power supply to the load of the electronic apparatus 1 by the battery pack 2. This realizes higher safety. If the electric apparatus has the lowest operating voltage of less than the (n×3 V), it is capable of supplying an electric power to the load of the electronic apparatus 1 by the battery pack 2 even if the battery voltage is equal to or less than the discharge stop voltage $V_a$ or even if the single cell voltage is less than 3 V. With the above sequence, a higher level of safety is realized than the levels of safety that can be realized with the secondary battery and the battery pack.

The nonaqueous electrolyte secondary battery will be explained below.

The nonaqueous electrolyte secondary battery includes a case, electrode group contained in the case and including positive and negative electrodes, and a nonaqueous electrolyte held by the electrode group.

As the case, a metal case or a laminated film case can be used. In FIGS. 2 and 3 described earlier, the present invention is applied to a cylindrical nonaqueous electrolyte secondary battery. However, it is also possible to use a prismatic or flatness nonaqueous electrolyte secondary battery.

The positive electrode is obtained by, for example, allowing a 20-μm thick collector such as an aluminum foil or titanium foil to carry a positive electrode active material (average particle size=3 μm) by using a binder, and pressing the resultant structure into a thin plate (coating amount=200 g/m², electrode thickness=140 μm). Examples of the positive electrode active material are various oxides such as lithium-cobalt composite oxide, lithium-nickel composite oxide, lithium-manganese composite oxide, lithium-containing nickel-cobalt oxide, lithium-containing vanadium oxide, and chalcogen compounds such as titanium disulfide and molybdenum disulfide. This positive electrode desirably contains graphite, carbon black, or the like as a conductive material. As the positive electrode active material, lithium-cobalt composite oxide, lithium-nickel composite oxide, or lithium-manganese composite oxide is desirable. In this case, it is possible to provide a high-capacity and a high-output nonaqueous electrolyte secondary battery.

The negative electrode is obtained by, for example, allowing a 12-μm thick collector such as a copper foil, stainless steel foil, or nickel foil to carry, by using a binder, an alkali metal such as lithium or a carbonaceous material which absorbs and releases lithium, and pressing the resultant structure into a thin plate (coating amount=80 g/m², electrode thickness=125 μm).

For example, the carbonaceous material can be formed by carbonizing coke or pitch of petroleum or coal, a lower-molecular-weight organic compound such as natural gas or lower hydrocarbon, or a synthetic polymer such as polyacrylonitrile or phenolic resin. It is also possible to use artificial or natural graphite.

A separator is provided between the positive and negative electrodes. As this separator, it is possible to use, e.g., synthetic resin nonwoven fabric or a polyolefin porous film (e.g., a polyethylene porous film or polypropyrene porous film).

The nonaqueous electrolyte contains a nonaqueous solvent and an electrolyte dissolved in this nonaqueous solvent. The nonaqueous electrolyte can be a liquid, gel, or solid electrolyte.

The nonaqueous solvent is not particularly limited. Examples are ethylene carbonate (EC), propyrenecarbonate (PC), dimethylcarbonate (DMC), methylethylcarbonate (MEC), diethylcarbonate (DEC), γ-butyloractone (BL), acetonitrile (AN), ethyl acetate (EA), toluene, xylene, and methyl acetate (MA). Examples of the electrolyte are lithium salts such as lithium perchlorate, lithium hexafluoride phosphate, lithium tetrafluoro borate, lithium arsenic hexafluoride, lithium trifluoromethanesulfonate, and lithium bistrifluoromethylsulfonylimide.

A battery of nonaqueous electrolyte single cells can be obtained by connecting a plurality of nonaqueous electrolyte single cells or a plurality of parallel-connected nonaqueous electrolyte single cells in series with each other. The method of connection is not particularly limited. For example, the cells can be connected by electrical and thermal welding by using low-resistance metal leads made of, e.g., copper, a copper alloy, nickel, or a nickel alloy that includes nickel plating, as leads for connecting cell terminals.

The present invention will be described in more detail below by way of its examples with reference to the accompanying drawings.

EXAMPLE 1

(Checking of Battery Temperature and Battery Voltage)

An overdischarge preventing circuit shown in FIG. 1 was incorporated into a battery pack formed by connecting four pairs of parallel-connected two cells in series. An electronic apparatus was a server power supply (200 W class) having a UPS function. First, in this overdischarge preventing circuit, the surface temperature of each single cell was measured by the thermocouple of the battery temperature detector 12 and found to be 25° C. The battery voltage and single cell voltage measured by the overcharge/overdischarge controller 14 were 16.2 V and 4.05 V, respectively.

As each single cell forming the battery pack, a #18650 (diameter=18 mm, height=65 mm) high-rate-discharge type cylindrical lithium ion single cell (e.g., a cell having an internal resistance (DC resistance) of 45 mΩ) having a theoretical capacity of 1,600 mAh was used.

(Discharge)

When this battery pack was discharged at 6C (9,600 mA), the battery temperature gradually rose, and the surface temperature $T_2$ of a single cell reached 68° C. when six minutes elapsed. Since the discharge rate A was 6C and the internal temperature (ambient temperature $T_0$) of the electronic apparatus was 20° C., the discharge control temperature $T_1$ calculated on the basis of equation (1) described previously was 68° C. The temperature comparator 13 outputs information indicating that the surface temperature $T_2$ of a single cell was higher than 68° C., as a detection signal to the discharge shutdown/control circuit 10. The battery voltage measured by the voltage comparator of the overcharge/overdischarge controller 14 was 11.8 V, i.e., lower than the discharge stop voltage $V_a$ (12 V). Therefore, the overcharge/overdischarge controller 14 outputs this information as a detection signal to the discharge shutdown/control circuit 10. Consequently, power supply to the load of the electronic apparatus 1 by the battery pack 2 was stopped, i.e., discharge was terminated.

Figure 5:
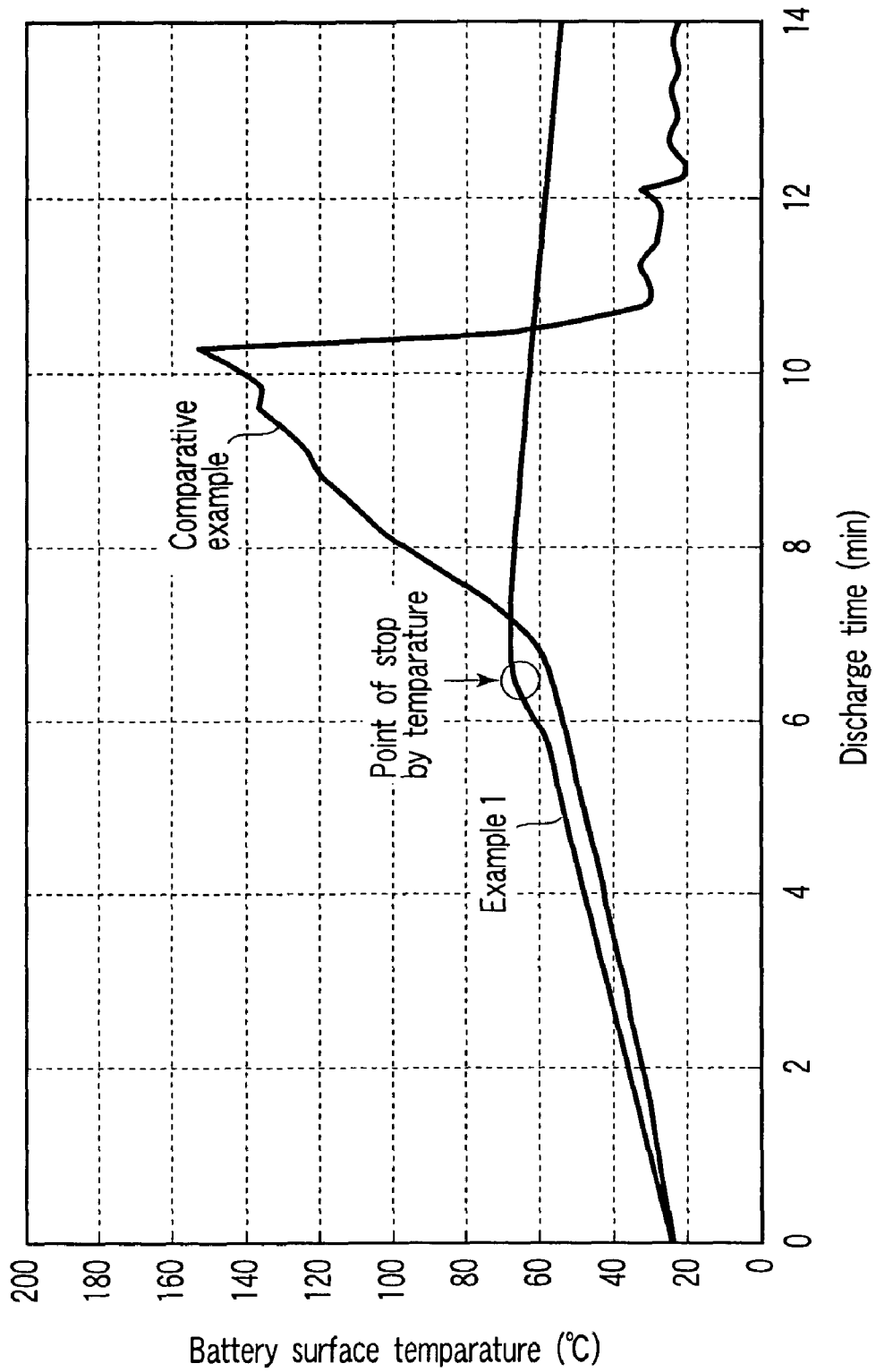
FIG. 5 is a graph showing changes in battery surface temperature with time in overdischarge preventing circuit apparatuses of Example 1 and comparative example.

After discharge was thus terminated, the battery temperature gradually lowered. When fourteen minutes elapsed from the start of discharge, the battery temperature was 60° C. or less. Also, neither a gas leakage nor a electrolyte leakage was caused by discharge. FIG. 5 shows a change in single cell surface temperature $T_2$ with time in Example 1. Referring to FIG. 5, the abscissa indicates the time (min) elapsed from the start of discharge, and the ordinate indicates the single cell surface temperature $T_2$ (° C.).

Comparative Example

Continuous discharge at 6C was performed following the same procedure as in Example 1 except that no discharge control by the battery surface temperature was performed. Consequently, as shown in FIG. 5, the battery temperature abruptly rose after seven minutes elapsed from the start of discharge. When ten minutes elapsed, the battery temperature exceeds 140° C., thereby the secondary battery exploded to set on ignition.

EXAMPLE 2

When a battery pack having a battery surface temperature, battery voltage, and single cell voltage similar to those explained in Example 1 was discharged at 6C, the battery temperature gradually rose. When six minutes elapsed, the surface temperature $T_2$ of each single cell reached 68° C., i.e., became higher than the discharge control temperature $T_1$ (68° C.) calculated on the basis of equation (1). The temperature comparator 13 outputs this information as a detection signal to the discharge shutdown/control circuit 10.

The battery voltage measured by the voltage comparator of the overcharge/overdischarge controller 14 was 12.6 V, i.e., higher than 12 V as the discharge stop voltage $V_a$, and the single cell voltage measured by the voltage comparator of the overcharge/overdischarge controller 14 was 3.15 V, i.e., higher than 3 V. The overcharge/overdischarge controller 14 outputs this information as a detection signal to the discharge shutdown/control circuit 10.

As a consequence, the discharge shutdown/control circuit 10 decreased the discharge rate to 2C (3,200 mA), and discharge was continued until the battery voltage became 12 V or less. The battery temperature gradually lowered by this low-rate discharge and became 40° C. or less after discharge was terminated. Neither a gas leakage nor an electrolyte leakage was caused by this discharge.

EXAMPLE 3

A battery pack of the same type as explained in Example 1 was discharged at 3C (4,800 mA). Since the discharge rate A was 3C and the internal temperature (ambient temperature $T_0$) of the electronic apparatus was 20° C., the discharge control temperature $T_1$ calculated on the basis of equation (1) was 44° C. The single cell surface temperature $T_2$ was not higher than 44° C. before the battery voltage measured by the overcharge/overdischarge controller 14 reached a discharge completion voltage of 10.8 V. Therefore, when the battery voltage reached 10.8 V, i.e., when the single cell voltage reached 2.7 V, the overcharge/overdischarge controller 14 outputs a detection signal to the discharge shutdown/control circuit 10 to terminate discharge.

Neither a gas leakage nor a electrolyte leakage was caused by this discharge. The battery temperature was lower than 40° C. after discharge was terminated. Note that the discharge completion voltage was calculated assuming that the discharge completion voltage of the single cell that the apparatus can allow was 2.7 V.

EXAMPLE 4

When a battery pack of the same type as explained in Example 1 was discharged at 4C (6,400 mA), the battery temperature gradually rose, and the single cell surface temperature $T_2$ reached 54° C. in 12 min. Since the discharge rate A was 4C and the internal temperature (ambient temperature $T_0$) of the electronic apparatus was 20° C., the discharge control temperature $T_1$ calculated on the basis of equation (1) was 52° C. The temperature comparator 13 outputs information indicating that the single cell surface temperature $T_2$ was higher than 52° C., as a detection signal to the discharge shutdown/control circuit 10. As a consequence, power supply to the load of the electronic apparatus 1 by the battery pack 2 is stopped, i.e., discharge was terminated. When discharge was thus terminated, the battery voltage was 13.0 V, and the single cell voltage was 3.25 V. Also, the battery temperature lowered after discharge was stopped, and was 50° C. or less when 5 minutes elapsed after discharge was terminated.

EXAMPLE 5

When a battery pack of the same type as explained in Example 1 was discharged at 7C (11,200 mA), the battery temperature gradually rose, and the single cell surface temperature $T_2$ reached 76° C. after 5 minutes elapsed. Since the discharge rate A was 7C and the internal temperature (ambient temperature $T_0$) of the electronic apparatus was 20° C., the discharge control temperature $T_1$ calculated on the basis of equation (1) was 76° C. The temperature comparator 13 outputs information indicating that the single cell surface temperature $T_2$ was higher than 76° C., as a detection signal to the discharge shutdown/control circuit 10, thereby terminating discharge. When discharge was thus terminated, the battery voltage was 13.2 V, and the single cell voltage was 3.3 V.

Neither a gas leakage nor a electrolyte leakage was caused by this discharge. Also, the battery temperature was lower than 80° C. when 10 minutes elapsed after discharge was terminated.

EXAMPLE 6

When a battery pack of the same type as explained in Example 1 was discharged at 8C (12,800 mA), the battery temperature gradually rose, and the single cell surface temperature $T_2$ reached 84° C. after 4 minutes elapsed. Since the discharge rate A was 8C and the internal temperature (ambient temperature $T_0O$) of the electronic apparatus was 20° C., the discharge control temperature $T_1$ calculated on the basis of equation (1) was 84° C. The temperature comparator 13 outputs information indicating that the single cell surface temperature $T_2$ was higher than 84° C., as a detection signal to the discharge shutdown/control circuit 10, thereby terminating discharge. When discharge was thus terminated, the battery voltage was 13.8 V, and the single cell voltage was 3.45 V.

Neither a gas leakage nor a electrolyte leakage was caused by this discharge. Also, the battery temperature was lower than 90° C. after discharge was terminated.

EXAMPLE 7

A battery pack of the same type as explained in Example 1 was discharged at 8C (12,800 mA). Since the discharge rate A was 8C and the internal temperature (ambient temperature $T_0$) of the electronic apparatus was 40° C., the discharge control temperature $T_1$ calculated on the basis of equation (1) was 104° C. If a battery pack is used at a battery temperature exceeding 100° C., thermal run away readily occurs, and this may lead to a dangerous state such as explosion or ignition.

Therefore, when the single cell surface temperature $T_2$ reached 100° C., the thermostat 11 shown in FIG. 2 operated to physically place the circuit in an open circuit state and to shutdown the passage of current. When the passage of current was thus shutdown, the voltage of the battery was 14.0V, and the voltage of the single cell was 3.50V.

By terminating discharge, belching of gas from the cell and electrolyte leakage were prevented. In addition, owing to heat dissipation, the temperature of the battery was reduced to a temperature below 100° C. immediately after the termination, and the battery was prevented from exhibiting thermal runaway behavior.

EXAMPLE 8

When a battery pack of the same type as explained in Example 1 was discharged at 5C (8,000 mA), the battery temperature gradually rose, and the single cell surface temperature $T_2$ reached 60° C. after 12 minutes elapsed. Since the discharge rate A was 5C and the internal temperature (ambient temperature $T_0$) of the electronic apparatus was 20° C., the discharge control temperature $T_1$ calculated on the basis of equation (1) was 60° C. The temperature comparator 13 outputs information indicating that the single cell surface temperature. $T_2$ was higher than 60° C., as a detection signal to the discharge shutdown/control circuit 10. As a consequence, power supply to the load of the electronic apparatus 1 by the battery pack 2 was stopped, i.e., discharge was terminated. When discharge was thus terminated, the battery voltage was 11.0 V, and the single cell voltage was 2.75 V. Also, when 5 minutes elapsed after discharge was terminated, the battery temperature was 60° C. or less.

EXAMPLE 9

When a battery pack of the same type as explained in Example 1 was discharged at 7C while the internal temperature (ambient temperature $T_0$) of the electronic apparatus was 40° C., the battery temperature gradually rose, and the surface temperature $T_2$ of each single cell became higher than the discharge control temperature $T_1$(96° C.). The temperature comparator 13 outputs this information as a detection signal to the discharge shutdown/control circuit 10.

The battery voltage measured by the overcharge/overdischarge controller 14 was 13.2 V, i.e., higher than 12 V as the discharge stop voltage $V_a$, and the single cell voltage measured by the overcharge/overdischarge controller 14 was 3.3 V, i.e., higher than 3 V. The overcharge/overdischarge controller 14 outputs this information as a detection signal to the discharge shutdown/control circuit 10.

Consequently, the discharge shutdown/control circuit 10 lowered the discharge rate to 2C (3200 mA), and discharge was continued until the battery voltage became 12 V or less. The battery temperature gradually decreased by this low-rate discharge, and became 80° C. or less after discharge was terminated. Neither a gas leakage nor a electrolyte leakage was caused by this discharge.

TABLE 1

| | Ambient temperature (° C.) | Discharge rate (C/mA) | Discharge control temperature $T_1$ (° C.) | Discharge control step | |
|---|---|---|---|---|---|
| | | | | Battery voltage (V) | Single cell voltage (V) |
| Example 1 | 20 | 6 C/9600 mA | 68 | 11.8 | 2.95 |
| Example 2 | 20 | 6 C/9600 mA | 68 | 12.6 | 3.15 |
| Example 3 | 20 | 3 C/4800 mA | 44 | 10.8 | 2.70 |
| Example 4 | 20 | 4 C/6400 mA | 52 | 13.0 | 3.25 |
| Example 5 | 20 | 7 C/11200 mA | 76 | 13.2 | 3.30 |
| Example 6 | 20 | 8 C/12800 mA | 84 | 13.8 | 3.45 |
| Example 7 | 40 | 8 C/12800 mA | 104 | 14.0 | 3.50 |
| Example 8 | 20 | 5 C/8000 mA | 60 | 11.0 | 2.75 |

TABLE 1-continued

| | | | | | |
|---|---|---|---|---|---|
| Example 9 | 40 | 7 C/11200 mA | 96 | 13.2 | 3.30 |
| Comparative Example | 20 | 6 C/9600 mA | — | — | — |

| | Discharge stop or discharge control method | Battery temperature after discharge was terminated | Battery status (gas leakage/electrolyte leakage) |
|---|---|---|---|
| Example 1 | Discharge stop (temperature) | <60° C. | None |
| Example 2 | Switch to low-rate discharge | <40° C. | None |
| Example 3 | Discharge stop (voltage) | <40° C. | None |
| Example 4 | Discharge stop (temperature) | <50° C. | None |
| Example 5 | Discharge stop (temperature) | <80° C. | None |
| Example 6 | Discharge stop (temperature) | <90° C. | None |
| Example 7 | Thermostat | <100° C. | None |
| Example 8 | Discharge stop (temperature) | <60° C. | None |
| Example 9 | Switch to low-rate discharge | <80° C. | None |
| Comparative Example | Discharge stop (voltage) | — | Explosion/ignition |

As is apparent from Table 1, for each of the battery packs of Examples 1, 2, 4, 5, 8, and 9, the discharge rate was set at 4C to 7C, and discharge was stopped or switched to low-rate discharge when the discharge control temperature $T_1$ defined by equation (1) was reached. Accordingly, the battery temperature after discharge was terminated was lower than 80° C. Especially when the discharge rate was lowered after the discharge control temperature $T_1$ was reached as in each of Examples 2 and 9, the charge capacity of the battery pack could be fully used while the battery temperature during discharge was suppressed.

In Example 3, a discharge current was as small as 3C. Therefore, the amount of heat generated by the battery was small, so discharge was terminated when the battery voltage reached 10.8 V as the discharge completion voltage before the battery temperature reached the discharge control temperature. This operation is a sound battery discharge terminating operation. Accordingly, it is desirable to apply discharge control by equation (1) when the discharge rate is 4C or more.

In Example 6 in which the discharge current was 8C, a temperature rise by Joule heat increased, so discharge was stopped because the discharge control temperature $T_1$ was reached when the single cell voltage was as high as 3.45 V. This high single cell voltage at the end of discharge indicates that discharge is still possible, i.e., a dischargeable battery capacity remains. Therefore, if the discharge current is as high as 8C, the high performance (capacity) of the battery may not be obtained even though dangerous states can be avoided.

In Example 7, the battery pack was discharged with a discharge current of 8C at an ambient temperature of 40° C. The calculated discharge control temperature was 104° C. Unfortunately, if a battery pack is used at a battery temperature exceeding 100° C., thermal run away readily occurs, and this may lead to a dangerous state such as explosion or ignition. So, the battery pack has a circuit configuration which stops discharge before the discharge control temperature is reached. Accordingly, when the ambient temperature $T_0$ is 10° C. to 45° C. in equation (1), the discharge rate A is preferably set from 4C to 7C.

As has been explained in detail above, the present invention can provide an overdischarge preventing circuit apparatus and overdischarge preventing method capable of preventing explosion and ignition when a nonaqueous electrolyte secondary battery is discharged at a high rate.

Additional advantages and modifications will readily occur to those skilled in the art. Therefore, the invention in its broader aspects is not limited to the specific details and representative embodiments shown and described herein. Accordingly, various modifications may be made without departing from the spirit and scope of the general inventive concept as defined by the appended claims and their equivalents.

What is claimed is:

1. An overdischarge preventing circuit apparatus for a nonaqueous electrolyte secondary battery, comprising:
a discharge control mechanism which controls discharge of the nonaqueous electrolyte secondary battery when a surface temperature of the nonaqueous electrolyte secondary battery exceeds a discharge control temperature $T_1$ (° C.) represented by $$T_1 = T_0 + QA \qquad (1)$$

where $T_0$ is an ambient temperature in a range of 0 to 60° C., Q is 8 (° C./C), and A is a discharge rate (C) of the nonaqueous electrolyte secondary battery in a case where a current required for discharging a nominal capacity of the nonaqueous electrolyte secondary battery in one hour is 1C, and is within a range of 4C to 7C.

2. An apparatus according to claim 1, wherein the discharge control temperature $T_1$ (° C.) is not more than a melting point of a separator of the nonaqueous electrolyte secondary battery.

3. An apparatus according to claim 1, wherein the discharge control temperature $T_1$ (° C.) is not more than 120° C.

4. An apparatus according to claim 1, further comprising a temperature detecting mechanism which measures the surface temperature of the nonaqueous electrolyte secondary battery.

5. An apparatus according to claim 4, wherein the temperature detecting mechanism comprises at least one of a thermocouple and a thermistor.

6. An apparatus according to claim 1, wherein the discharge control mechanism comprises a temperature comparator which compares the surface temperature with the discharge control temperature $T_1$, and a discharge control/discharge stop circuit which performs discharge stop and discharge control on the basis of an output from the temperature comparator.

7. An overdischarge preventing circuit apparatus for a battery pack including a battery in which units each obtained by connecting nonaqueous electrolyte single cells in parallel are connected in series, comprising:

a discharge control mechanism which, when a surface temperature of the battery exceeds a discharge control temperature $T_1$ (° C.) represented by equation (1) below, stops discharge of the battery pack if a voltage of the battery is not more than a discharge stop voltage $V_a$ (V) represented by equation (2) below or a voltage of the single cell is less than 3 V, and lowers a discharge rate of the battery pack if the voltage of the battery is higher than the discharge stop voltage $V_a$ (V) and the voltage of the single cell is not less than 3 V:

$$T_1 = T_0 + QA \tag{1}$$

where $T_0$ is an ambient temperature (° C.), Q is 8 (° C./C), and A is a discharge rate (C); and $$V_a = n \times 3 \text{ (V)} \tag{2}$$

where n is the number of series-connected units in the battery.

8. An apparatus according to claim 7, wherein the ambient temperature $T_0$ is 0° C. to 60° C.

9. An apparatus according to claim 7, wherein the discharge rate A is 4C to 7C.

10. An apparatus according to claim 7, wherein the discharge control temperature $T_1$ (° C.) is not more than a melting point of a separator of the nonaqueous electrolyte single cell.

11. An apparatus according to claim 7, wherein the discharge control temperature $T_1$ (° C.) is not more than 120° C.

12. An apparatus according to claim 7, further comprising a temperature detecting mechanism which measures the surface temperature of the battery.

13. An apparatus according to claim 12, wherein the temperature detecting mechanism comprises at least one of a thermocouple provided on a surface of the single cell and a thermistor electrically connected to the single cell.

14. An apparatus according to claim 7, wherein the discharge control mechanism comprises a temperature comparator which compares the surface temperature with the discharge control temperature $T_1$, a voltage comparator which compares the voltage of the battery with the discharge stop voltage $V_a$ and the voltage of the single cell with 3 V, and a discharge control/discharge stop circuit which performs discharge stop and discharge control on the basis of outputs from the temperature comparator and voltage comparator.

15. A secondary battery overdischarge preventing method comprising controlling discharge of a nonaqueous electrolyte secondary battery when a surface temperature of the nonaqueous electrolyte secondary battery exceeds a discharge control temperature $T_1$ (° C.) represented by $$T_1 = T_0 + QA \tag{1}$$

where $T_0$ is an ambient temperature (° C.), Q is 8 (° C./C), and A is a discharge rate (C) of the nonaqueous electrolyte secondary battery in a case where a current required for discharging a nominal capacity of the nonaqueous electrolyte secondary battery in one hour is 1C, and is within a range of 4C to 7C.

16. A method according to claim 15, wherein the discharge control is performed by stopping discharge or lowering a discharge current.

17. The method according to claim 15, wherein the discharge control temperature $T_1$ (° C.) is not more than a melting point of a separator of the nonaqueous electrolyte secondary battery.

18. A method according to claim 15, wherein the discharge control temperature $T_1$ (° C.) is not more than 120° C.

19. An overdischarge preventing method for a battery pack including a battery in which units each obtained by connecting nonaqueous electrolyte single cells in parallel are connected in series, comprising:

when a surface temperature of the battery exceeds a discharge control temperature $T_1$ (° C.) represented by equation (1) below, stopping discharge of the battery pack if a voltage of the battery is not more than a discharge stop voltage $V_a$ (V) represented by equation (2) below or a voltage of the single cell is less than 3 V, and lowering a discharge rate of the battery pack if the voltage of the battery is higher than the discharge stop voltage $V_a$ (V) and the voltage of the single cell is not less than 3 V:

$$T_1 = T_0 + QA \tag{1}$$

where $T_0$ is an ambient temperature (° C.), Q is 8 (° C./C), and A is a discharge rate (C); and $$V_a = n \times 3 \text{ (V)} \tag{2}$$

where n is the number of series-connected units in the battery.

* * * * *

UNITED STATES PATENT AND TRADEMARK OFFICE
CERTIFICATE OF CORRECTION

| | | |
|---|---|---|
| PATENT NO. | : 7,253,588 B2 | Page 1 of 1 |
| APPLICATION NO. | : 10/650769 | |
| DATED | : August 7, 2007 | |
| INVENTOR(S) | : Satoh et al. | |

It is certified that error appears in the above-identified patent and that said Letters Patent is hereby corrected as shown below:

On the title page, Item (54), the Title information is incorrect. Item (54) should read:

-- (54) OVERDISCHARGE PREVENTING CIRCUIT APPARATUS FOR A NONAQUEOUS ELECTROLYTE SECONDARY BATTERY, OVERDISCHARGE PREVENTING CIRCUIT APPARATUS FOR A BATTERY PACK, SECONDARY BATTERY OVERDISCHARGE PREVENTING METHOD AND OVERDISCHARGE PREVENTING METHOD FOR A BATTERY PACK --

Signed and Sealed this

Sixteenth Day of October, 2007

JON W. DUDAS
*Director of the United States Patent and Trademark Office*